United States Patent

[11] 3,594,998

| [72] | Inventors | Curt L. Graversen;<br>Duane M. Gibson, both of Milwaukie, Oreg. |
|---|---|---|
| [21] | Appl. No. | 4,163 |
| [22] | Filed | Jan. 15, 1970 |
| [45] | Patented | July 27, 1971 |
| [73] | Assignee | Omark Industries, Inc.<br>Portland, Oreg.<br>Continuation of application Ser. No.<br>667,829, Sept. 14, 1967, now abandoned. |

[54] VEGETATION CUTTER ASSEMBLIES
13 Claims, 12 Drawing Figs.

| [52] | U.S. Cl. | 56/290 |
|---|---|---|
| [51] | Int. Cl. | A01d 55/24 |
| [50] | Field of Search | 56/290–<br>—292, 244 |

[56] References Cited
UNITED STATES PATENTS

| 2,744,376 | 5/1956 | Miner | 56/244 |
|---|---|---|---|
| 374,397 | 12/1887 | Clark | 56/291 |
| 3,043,079 | 7/1962 | Aston | 56/290 |
| 3,397,524 | 8/1968 | Hofer | 56/290 |

*Primary Examiner*—Louis G. Mancene
*Assistant Examiner*—J. N. Eskovitz

ABSTRACT: A cutter 24 has a body secured to a belt and a tilted, power-sharpenable cutter plate secured directly to the body. Cutters 54 and 74 also have keying tabs on the bodies thereof. A cutter 94 has a body secured to a belt by a thin vulcanized layer. A cutter 124 is power sharpenable and has a body embedded in a belt.

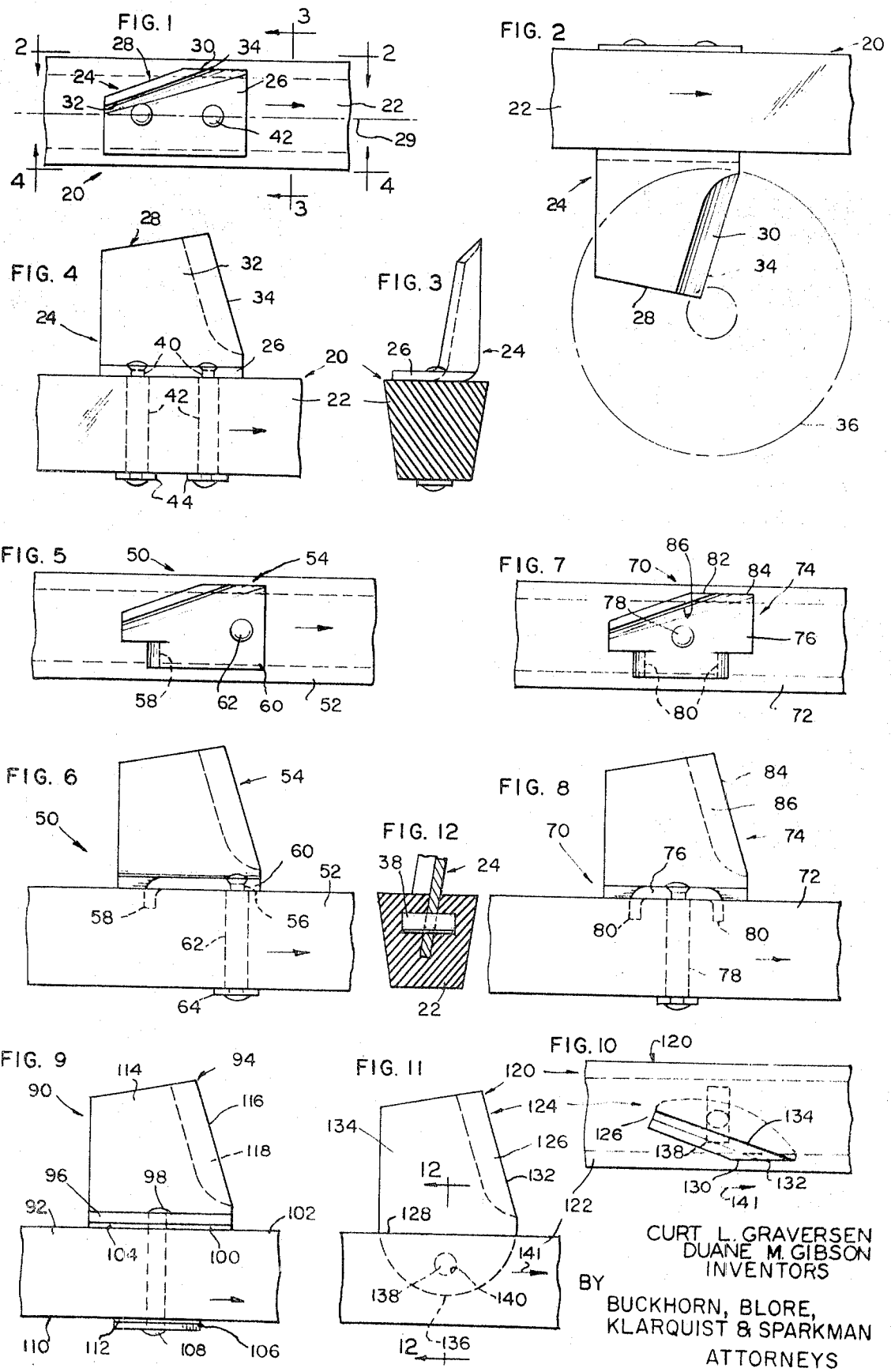

3,594,998

1

VEGETATION CUTTER ASSEMBLIES

This application is a streamline continuation of my earlier application Ser. No. 667,829, filed Sept. 14, 1967, now abandoned.

DESCRIPTION

This invention relates to improved vegetation cutter assemblies, and more particularly to improved side-sharpenable vegetation cutter assemblies.

It has been proposed to cut vegetation with endless cutter assemblies including endless rubber V-belts with cutters secured to the belts having inclined cutter plates which can be sharpened by bringing an abrasive member into contact with the forward ends of the cutter plates as the cutter plates are advanced by the belt. In operation, the belt is advanced at a high rate of speed so that impact cutting of vegetation is effected. This subjects the connecting structures of the belt and the cutters to severe stresses. It would be desirable to provide simple, long-life connecting structures for the belts and the cutters.

An object of the invention is to provide new and improved vegetation cutter assemblies.

Another object of the invention is to provide new and improved side-sharpenable vegetation cutter assemblies.

A further object of the invention is to provide side-sharpenable cutter assemblies in which cutters are fastened to endless rubber belts with strong, long-life connecting structures.

Another object of the invention is to provide side-sharpenable cutters having side-sharpenable plates directly joining body portions.

The invention provides improved side-sharpenable cutter assemblies including endless rubber or rubberlike belts and sheet metal cutters having bodies secured to the outer faces of the belts and inclined side-sharpenable cutter plates carried by the bodies. In a cutter assembly forming one specific embodiment of the invention, a cutter has a body secured by rivets to the belt and also has an inclined cutter plate joined directly to the body with no offsetting portions. In a cutter assembly forming another specific embodiment of the invention, a cutter has a body secured to a belt by a rivet and one or more tangs embedded in the belt to key the body to the belt while permitting flexure of the belt. In a vegetation cutter forming another specific embodiment of the invention, a cutter has a body secured by a rivet and a vulcanized layer adhered to the body and to the outer face of the belt. In a vegetation cutter forming another specific embodiment of the invention, a planar cutter has a body portion embedded in a belt along with a transverse pin.

A complete understanding of the invention may be obtained from the following detailed description of improved vegetation cutter assemblies forming specific embodiments thereof, when read in conjunction with the appended drawings, in which:

FIG. 1 is a front elevation view of a vegetation cutter assembly forming one embodiment of the invention;

FIG. 2 is a top plan view taken along line 2–2 of FIG. 1;

FIG. 3 is a vertical sectional view taken along line 3–3 of FIG. 1 and turned 90°;

FIG. 4 is a bottom plan view taken along line 4–4 of FIG. 1;

FIG. 5 is a front elevation view of a vegetation cutter assembly forming an alternate embodiment of the invention;

FIG. 6 is a bottom plan view of the cutter assembly of FIG. 5;

FIG. 7 is a front elevation view of a vegetation cutter assembly forming an alternate embodiment of the invention;

FIG. 8 is a bottom plan view of the cutter assembly of FIG. 7;

FIG. 9 is a top plan view of a cutter assembly forming an alternate embodiment of the invention;

FIG. 10 is a front elevation view of a cutter assembly forming an alternate embodiment of the invention;

FIG. 11 is a bottom plan view of the cutter assembly of FIG. 10; and

FIG. 12 is a vertical sectional view taken along line 12–12 of FIG. 10 and turned 90°.

EMBODIMENT OF FIGS. 1 TO 4

Referring now in detail to the drawings, a cutter assembly 20 forming one specific embodiment of the invention includes an endless V-belt 22 of reinforced rubber or rubberlike material and cutters 24 secured to the outer face of the V-belt at closely spaced points along the V-belt. Each cutter is formed by bending a sheet metal blank and includes a body or mounting flange 26 and an outwardly projecting cutter plate 28 forming a slightly obtuse angle with the flange 26. The cutter plate 28 is planar and is tilted forwardly and laterally or sidewise relative to a horizontal plane 29 in which lies the pitch line of the endless V-belt. Each cutter plate has a forward edge or end surface 30, which is a side-sharpenable surface and, with a forward face 32 of the plate, defines a swept-back cutting edge 34. The surface 30 preferably lies in a plane parallel to the plane 29 and is sharpened by a sharpening member 36 (FIG. 2) as the cutter plate 28 is advanced past the sharpening member. The flange 26 is secured to the belt by shouldered rivets 42 having reduced portions 40 and by washers 44.

The cutter plate 28 extends rearwardly from the cutting edge 34 and is shown inclined downwardly preferably at an angle of about 45°. However, the cutter plate may be inclined rearwardly and upwardly from the cutting edge 34 with the sharpening end surface 30 being on the bottom and forward extremity of the cutter plate, which construction provides excellent clearing action of cut vegetation.

EMBODIMENT OF FIGS. 5 AND 6

A cutter assembly 50 forming an alternate embodiment of the invention includes an endless V-belt 52 of reinforced rubber or rubberlike material having cutters 54 secured to the outer face thereof at spaced points therealong. Each cutter 54 is identical to the cutter 24 (FIG. 1 to 4) except that the cutter 54 has only one rivet hole 56 and has a corner tang or tab 58 cut and bent out of the plane of a body or mounting flange 60 and embedded in the V-belt. A rivet 62 and a washer 64 hold the flange 60 to the V-belt and the tab keys the flange 60 to the V-belt. The tab may be pointed if desired to facilitate penetration into the rubber V-belt. The tab permits the portion of the belt spaced from the rivet to flex slightly away from the body as the belt travels around the drive and guide pulleys (not shown); that is, this construction permits the belt to flex naturally with no interference from the body.

EMBODIMENT OF FIGS. 7 AND 8

A cutter assembly 70 forming an alternate embodiment of the invention includes an endless, rubber V-belt 72 and cutters 74 spaced therealong. Each cutter 74 is identical to the cutter 54 (FIGS. 5 and 6) except that a mounting flange or body 76 of the cutter 74 is secured to the V-belt by a centrally positioned rivet 78 and two keying tangs or tabs 80 located at the ends of the mounting flange. The keying tabs 80 are pointed, are embedded in the V-belt, and permit natural flexing of the belt. The cutter plate has a side-sharpenable end surface 82 forming a cutting edge 84 with the bottom face 86.

EMBODIMENT OF FIG. 9

A cutter assembly 90 forming an alternate embodiment of the invention includes an endless, rubber V-belt 92 and cutters 94 spaced therealong. Each cutter 94 is identical to the cutter 24 except that a mounting flange or body 96 of the cutter 94 is secured to the V-belt by a single, centrally located rivet 98 and by a thin, rubber, adhering layer 100 vulcanized to outer surface 102 of the V-belt and to a face 104 of the body. A washerlike plate 106 under an inner head 108 of the rivet is secured to inner face 110 of the V-belt by a thin, rubber, adhering layer 112 vulcanized to both the washer and the face 110. The cutter 94 includes a cutting plate 114 inclined upwardly and rearwardly from a forward cutting edge 116 and has a horizontal, bottom, sharpening surface 118.

EMBODIMENT OF FIGS. 10, 11 and 12

A cutter assembly 120 forming an alternate embodiment of the invention includes an endless, rubber, V-belt 122 and cutters 124 secured thereto at spaced points therealong. The V-belt is of well-known reinforced construction and may be of rubberlike material. Each cutter 124 is a planar plate of sheet metal having a cutter plate portion 126 extending outwardly from other face 128 of the V-belt and lying in a plane extending rearwardly and upwardly relative to the V-belt. A lower or bottom, forward end surface 130 of each cutter plate portion lies in a horizontal plane and is abradable as the cutter plate is advanced past a sharpening member (not shown) to sharpen a swept-back cutting edge 132 formed at the juncture of the surface 130 and upper, forward face 134 of the cutter plate portion. The cutter 124 also includes a rounded tang or anchor portion 136 embedded in a slot in the V-belt and preferably having the V-belt vulcanized thereto. An anchoring pin or retainer member 138 embedded in the V-belt, and preferably having the rubber V-belt strongly adhered thereto by vulcanization, extends through a hole 140 in the tang portion 136 to further secure the tang portion to the belt. The upward and rearward inclination of the cutter plate portion has been found to be desirable for certain vegetation-cutting operations. The V-belt is, of course, advanced in the direction of an arrow 141.

The above-described side-sharpenable cutter assemblies are highly effective for mowing and cutting. The cutter assemblies are light in weight and can be driven at high speeds such as to cut several times as fast as conventional mowers. For example, the cutter assemblies are adapted to be moved forwardly through heavy crop material at speeds of over 10 miles per hour, the cutter assemblies being advanced at speeds greater than 4,000 feet per minute. The cutters have large widths which may be sharpened and still be effective, and have quite acute but durable cutting edges. The cutters can be easily sharpened and can be easily replaced, and are as light as possible while being ruggedly secured to the belts.

It is to be understood that the above-described arrangements are simply illustrative of the application of the principles of the invention. Numerous other arrangements may be readily devised by those skilled in the art which will embody the principles of the invention and fall within the spirit and scope thereof.

We claim:

1. In a vegetation cutter assembly,
an endless V-belt having slots therein tilted relative to the plane of the pitch line of the belt,
a plurality of planar cutter members having shank portions extending into the slots and also having cutting plate portions free of the belt having forward ends and cutting edges at the forward ends and sharpenable forward edge surfaces lying in a plane parallel to the adjacent portion of the pitch line of the belt,
and retainer means extending generally transversely of the shank portions and engaging the V-belt to hold the shank portions in the slots.

2. The vegetation cutter assembly of claim 1 wherein the retainer means comprise pins extending through holes in the shank portions.

3. The vegetation cutter assembly of claim 2 wherein the pins are embedded in the V-belt.

4. In a cutter structure,
an endless V-belt having an outer face and an inner face and adapted to be driven in a forward direction,
a cutter body abutting the outer face of the V-belt,
a cutter blade secured to the cutter body and extending outwardly away from the outer face of the V-belt,
and attachment means secured to the cutter body including a fastening portion positioned near the forward end of said cutter body and extending therefrom through the V-belt to and beyond the inner face of the V-belt and having an enlarged portion at the inner face of the V-belt to hold the forward end portion of the cutter body against the V-belt and permitting flexing of the V-belt away from the rear portion of the cutter body,
the portion of the V-belt rearwardly of the fastening portion being free to flex away from the cutter body,
the attachment means including keying means engaging the V-belt and keying the cutter body to the V-belt to prevent turning of the cutter body about an axis normal to the outer face of the V-belt.

5. In a vegetation cutter,
an endless V-belt having an outer face and lying in a predetermined plane and adapted to be advanced in a predetermined direction,
and a cutter means having a body portion engaging a wide and elongated portion of the outer face of the V-belt and also including securing means extending into the V-belt and holding the body portion against the outer face of the V-belt and a cutter plate extending generally along said direction but inclined relative to said direction and having a forward face and a sharpenable forward end surface forming a cutting edge with the forward face of the cutter plate,
the cutter having no portions positioned directly forwardly or directly rearwardly of the sharpenable forward edge surface so that the forward edge surface can be freely moved by the V-belt over a sharpening member when the V-belt is advanced in said direction,
the securing means comprising a tension member secured to the body portion and to a portion of the V-belt spaced from the outer face of the V-belt, and including anchor means at said portion of the belt securing the tension member to the belt.

6. The vegetation cutter of claim 5 wherein the forward edge surface of the cutter plate lies in a plane parallel to said predetermined plane.

7. The vegetation cutter of claim 5 wherein the tension member extends completely through the belt and the anchor means is positioned at the inner face of the belt.

8. The vegetation cutter of claim 5 wherein the body portion and the cutter plate are of integral sheet metal.

9. In a cutter structure,
an endless V-belt having an outer face and an inner face and adapted to be driven in a forward direction,
platelike cutter body means abutting the outer face of the V-belt,
a cutter blade secured to the cutter body means and extending outwardly away from the outer face of the V-belt,
keying means secured to the cutter body means and extending into and embedded in the V-belt to hold the body means against turning about an axis transverse to the outer face of the V-belt,
and means anchoring the keying means in the belt and tensioning the keying means sufficiently to hold the body means against the outer face of the V-belt,
the cutter blade being tilted about an axis in a plane including the pitchline of the belt and forming a substantial angle to the pitchline of the portion of the belt immediately adjacent to the cutter blade and having a forward face and a forward end surface in a plane parallel to said direction and forming an acute cutting edge with the forward face,
the cutter structure having no obstructions preventing movement in said direction of the forward end surface of the cutter blade over an abrading member.

10. The cutter structure of claim 9 wherein the body means is a plate integral with the cutter blade and substantially normal to the cutter blade.

11. The cutter structure of claim 9 wherein the keying means is integral with the body means.

12. The cutter structure of claim 9 wherein the keying means is platelike.

13. The cutter structure of claim 12 wherein the keying means is a tab integral with the body means.